US012785169B2

(12) United States Patent
Ju et al.

(10) Patent No.: US 12,785,169 B2
(45) Date of Patent: Nov. 3, 2026

(54) SECONDARY BATTERY MODULE

(71) Applicant: SK INNOVATION CO., LTD., Seoul (KR)

(72) Inventors: Seung Hoon Ju, Daejeon (KR); Kwan Yong Kim, Daejeon (KR); Dong Ju Kim, Daejeon (KR); Sung Yeop Kim, Daejeon (KR); Jin Go Kim, Daejeon (KR); Tae Il Kim, Daejeon (KR); Seung Noh Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 788 days.

(21) Appl. No.: 17/565,366

(22) Filed: Dec. 29, 2021

(65) Prior Publication Data

US 2022/0158272 A1 May 19, 2022

Related U.S. Application Data

(63) Continuation of application No. 16/381,544, filed on Apr. 11, 2019, now Pat. No. 11,245,141, which is a (Continued)

(30) Foreign Application Priority Data

Dec. 6, 2016 (KR) ........................ 10-2016-0164957
Dec. 20, 2016 (KR) ........................ 10-2016-0174846

(51) Int. Cl.
*H01M 10/6554* (2014.01)
*H01M 10/613* (2014.01)
(Continued)

(52) U.S. Cl.
CPC ..... *H01M 10/6554* (2015.04); *H01M 10/613* (2015.04); *H01M 10/647* (2015.04);
(Continued)

(58) Field of Classification Search
CPC ........... H01M 10/6554; H01M 10/613; H01M 10/647; H01M 10/6551; H01M 50/105;
(Continued)

(56) References Cited

U.S. PATENT DOCUMENTS

2003/0215709 A1* 11/2003 Hosokawa ............... H01G 9/08 429/129
2012/0107663 A1* 5/2012 Burgers ............ H01M 10/6556 429/120

FOREIGN PATENT DOCUMENTS

CN 106025423 A 10/2016
CN 106067525 A 11/2016
(Continued)

OTHER PUBLICATIONS

WO2014014285A1 Machine translation.*
(Continued)

*Primary Examiner* — Brian R Ohara
*Assistant Examiner* — Quintin D. Elliott
(74) *Attorney, Agent, or Firm* — IP&T GROUP LLP

(57) ABSTRACT

A secondary battery module includes a plurality of pouch type secondary batteries stacked in parallel, and a cooling plate configured to cool the plurality of stacked pouch type secondary batteries, wherein each of the pouch type secondary batteries includes a sealing portion and a close contact portion formed by an exterior material in an outer periphery thereof, the sealing portion is formed at three of four sides of the pouch type secondary battery and the close contact portion is formed at the other side of the pouch type secondary battery, an extending portion protruding in a direction perpendicular to the close contact portion is formed at a portion of the sealing portion adjacent to the close contact portion, and the cooling plate is brought into contact with the close contact portions of the plurality of (Continued)

10 stacked pouch type secondary batteries and cools the close contact portions.

16 Claims, 12 Drawing Sheets

Related U.S. Application Data continuation of application No. PCT/KR2017/014255, filed on Dec. 6, 2017.

(51) Int. Cl.

| | |
|---|---|
| ***H01M 10/647*** | (2014.01) |
| ***H01M 10/6551*** | (2014.01) |
| ***H01M 50/105*** | (2021.01) |
| ***H01M 50/119*** | (2021.01) |
| ***H01M 50/211*** | (2021.01) |
| ***H01M 50/291*** | (2021.01) |
| ***H01M 50/548*** | (2021.01) |
| ***H01M 50/557*** | (2021.01) |

(52) U.S. Cl.
CPC ..... *H01M 10/6551* (2015.04); *H01M 50/105* (2021.01); *H01M 50/119* (2021.01); *H01M 50/211* (2021.01); *H01M 50/291* (2021.01); *H01M 50/548* (2021.01); *H01M 50/557* (2021.01)

(58) Field of Classification Search
CPC ............ H01M 50/119; H01M 50/211; H01M 50/291; H01M 50/548; H01M 50/557
See application file for complete search history.

(56) References Cited

FOREIGN PATENT DOCUMENTS

| | | | | | |
|---|---|---|---|---|---|
| JP | 2001060452 | A | * | 3/2001 | |
| KR | 20060037827 | A | | 5/2006 | |
| KR | 10-0998845 | B1 | | 12/2010 | |
| KR | 10-2013-0073582 | A | | 7/2013 | |
| KR | 10-2015-0061990 | A | | 6/2015 | |
| KR | 10-2016-0045468 | A | | 4/2016 | |
| KR | 20160133776 | A | * | 4/2016 | |
| KR | 101792751 | B1 | * | 10/2017 | |
| WO | WO-2014014285 | A1 | * | 1/2014 | ........ H01M 10/0472 |

OTHER PUBLICATIONS

KR 101792751 B1 Machine Translation (equivalent to machine translation for KR 20160133776A).*
JP-2001060452-A Machine Translation.*
Notice of Allowance for the Korean Patent Application No. 10-2017-0175973 issued by the Korean Intellectual Property Office on Nov. 27, 2023.
Office Action for the Chinese Patent Application No. 202210097006.X issued by the Chinese Patent Office on May 24, 2023.

* cited by examiner

SECONDARY BATTERY MODULE

CROSS-REFERENCE TO RELATED APPLICATION

This application is a continuation of U.S. patent application Ser. No. 16/381,544 filed on Apr. 11, 2019, which is a continuation of PCT/KR2017/014255 filed on Dec. 6, 2017, which claims priority to and the benefit of Korean Patent Application No. 10-2016-0164957 filed on Dec. 6, 2016 and No. 10-2016-0174846 filed on Dec. 20, 2016, the disclosure of which is incorporated herein by reference in its entirety.

BACKGROUND

1. Field of the Invention

Embodiments of the present disclosure relate generally to a secondary battery module and, more particularly, to a secondary battery module including an improved, more efficient cooling.

2. Discussion of Related Art

Secondary batteries that can be charged and discharged many times are actively being researched due to the development of advanced devices in various electronic fields such as digital cameras, cellular phones, laptop computers, hybrid vehicles, and the like. Examples of the secondary battery may include a nickel-cadmium battery, a nickel-metal hydride battery, a nickel-hydrogen battery, and a lithium secondary battery. Among the above batteries, the lithium secondary battery has an operating voltage of 3.6 V or higher and is preferably used as a power source for portable electronic devices. A plurality of lithium secondary batteries connected in series may be used in a high-output electric or hybrid vehicles. Use of the lithium secondary battery has rapidly increased because of the fact that the operating voltage thereof is three times higher than that of the nickel-cadmium battery or the nickel-metal hydride battery, and the lithium secondary battery has excellent energy density per unit of weight.

Referring to FIGS. 1 and 2, in a conventional pouch type secondary battery included in a secondary battery module 1, a battery cell is accommodated in a pouch type film and is sealed with the pouch type film, and a sealing portion 6 is formed. The sealing portion 6 is sealed at upper and lower sides of the pouch type secondary battery and at both sides from which electrode tabs 4 are drawn. Therefore, it is possible to cool only a side surface of the pouch type secondary battery at which no sealing portion is formed when cooling the pouch type secondary battery. Therefore, conventionally, a secondary battery module is formed to have a cooling space for indirect air cooling or direct air cooling to cool the pouch type secondary battery. FIG. 1 illustrates a secondary battery module 1 having a separate cooling fin 2 for indirect air cooling. Specifically, in the case of indirect air cooling, a volume of the secondary battery module is increased because of the shape and space of a separate cooling fin or fins which may be required for indirect cooling.

DOCUMENT OF RELATED ART

Patent Document

Korean Patent Application Publication No. 10-2015-0132996 (Published on Nov. 27, 2015).

SUMMARY OF THE INVENTION

Embodiments of the present disclosure provide a secondary battery module including an improved, more efficient cooling. The secondary battery module may be a pouch type secondary battery and may include cooling plate capable of cooling a close contact portion of the pouch type secondary battery. Preferably, the secondary battery may be a lithium secondary battery.

Other embodiments of the present disclosure provide a secondary battery module in which a sealing portion at a close contact portion of a pouch type secondary battery is not sealed and a cooling plate is brought into contact with the close contact portion.

Other embodiments of the present disclosure provide a secondary battery module capable of cooling a close contact portion through a cooling plate in a pouch type secondary battery in which a sealing portion is not formed in the close contact portion.

According to an aspect of the present disclosure, there is provided a secondary battery module including a plurality of pouch type secondary batteries stacked in parallel, and a cooling plate configured to cool the plurality of stacked pouch type secondary batteries, wherein each of the pouch type secondary batteries includes a sealing portion and a close contact portion formed by an exterior material in an outer periphery thereof, the sealing portion is formed at three of four sides of the pouch type secondary battery and the close contact portion is formed at the other side of the pouch type secondary battery, and the cooling plate is brought into contact with the close contact portions of the plurality of stacked pouch type secondary batteries and cools the close contact portions.

A plurality of protrusions may be formed on the cooling plate, and each of the protrusions may be arranged to extend between the close contact portions of adjacent pouch type secondary batteries.

Each of the protrusions may have a curved surface corresponding to a shape of a portion of the close contact portion.

An intermediate portion configured to accommodate the extending portion may be formed between the plurality of protrusions.

A concave portion may be formed in the close contact portion in a longitudinal direction thereof.

The intermediate portion may include a concave portion support configured to protrude to correspond to the concave portion in the longitudinal direction of the close contact portion, and an insertion groove formed to be embedded in an outer side of the concave portion support in a longitudinal direction of the concave portion support and configured to accommodate the extending portion.

The cooling plate may be formed with a thermally conductive material.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EMBODIMENTS

Hereinafter, various embodiments of the present disclosure will be described in detail with reference to the drawings. However, these embodiments are only examples, and the present disclosure is not limited thereto.

When it is determined that detailed descriptions of related well-known functions unnecessarily obscure the gist of the present disclosure during the description of the present disclosure, the detailed descriptions will be omitted. Some terms described below are defined in consideration of functions in the present disclosure, and meanings thereof may vary depending on, for example, a user or operator's intentions or customs. Therefore, the meanings of terms should be interpreted on the basis of the scope of the present disclosure throughout this specification.

The spirit and scope of the present disclosure are defined by the appended claims. The following embodiments are only made to efficiently describe the technological scope of the present disclosure to those skilled in the art.

Secondary batteries such as lithium ion batteries or pouch type lithium polymer batteries may be used in various electrical devices such as electric vehicles. Hereinafter, all such secondary batteries will be referred to as a secondary battery. The present invention is particularly suitable for secondary lithium batteries.

Figure 1:
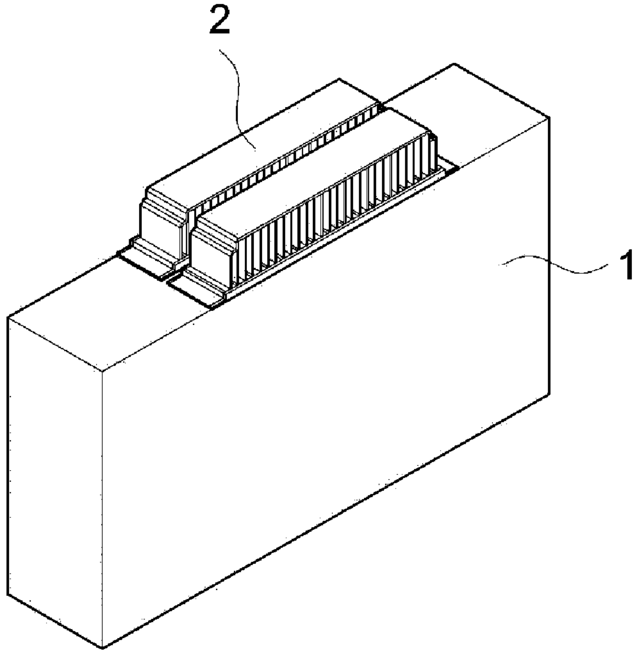
FIG. 1 is a view illustrating a conventional secondary battery module.
Figure 2A:
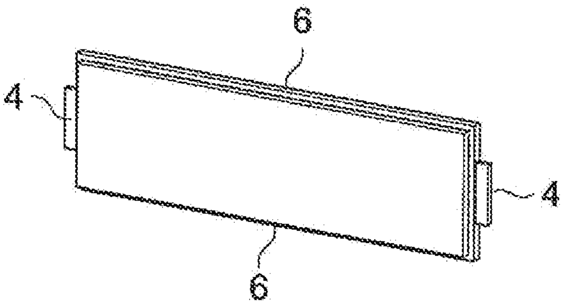
FIGS. 2A and 2B are views illustrating a conventional pouch type secondary battery.
Figure 2B:
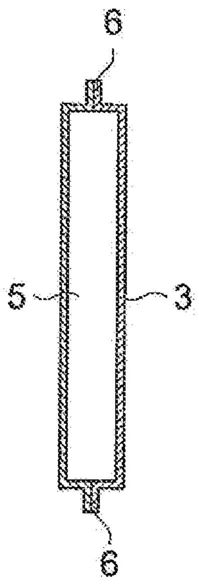
Figure 3:
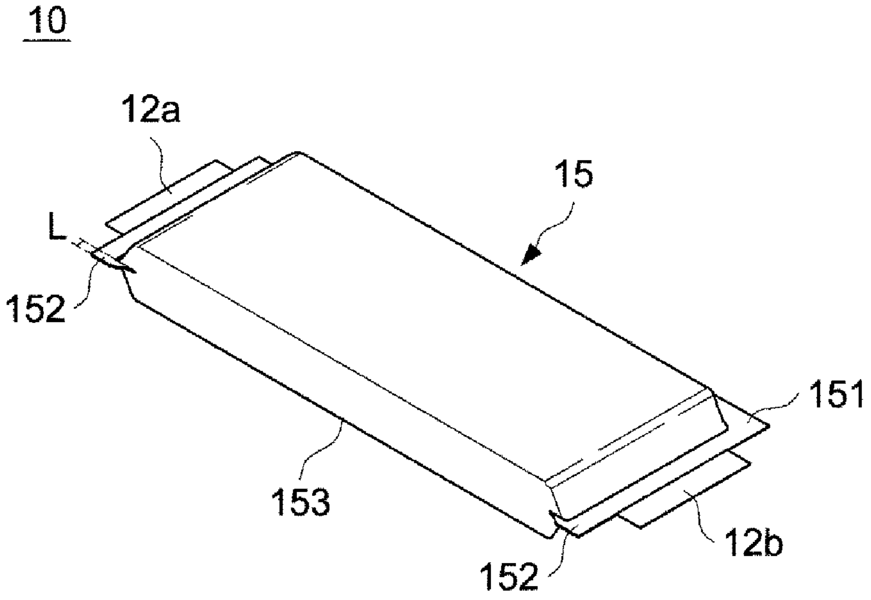
FIG. 3 is a perspective view of a pouch type secondary battery according to one embodiment of the present disclosure.
Figure 4:
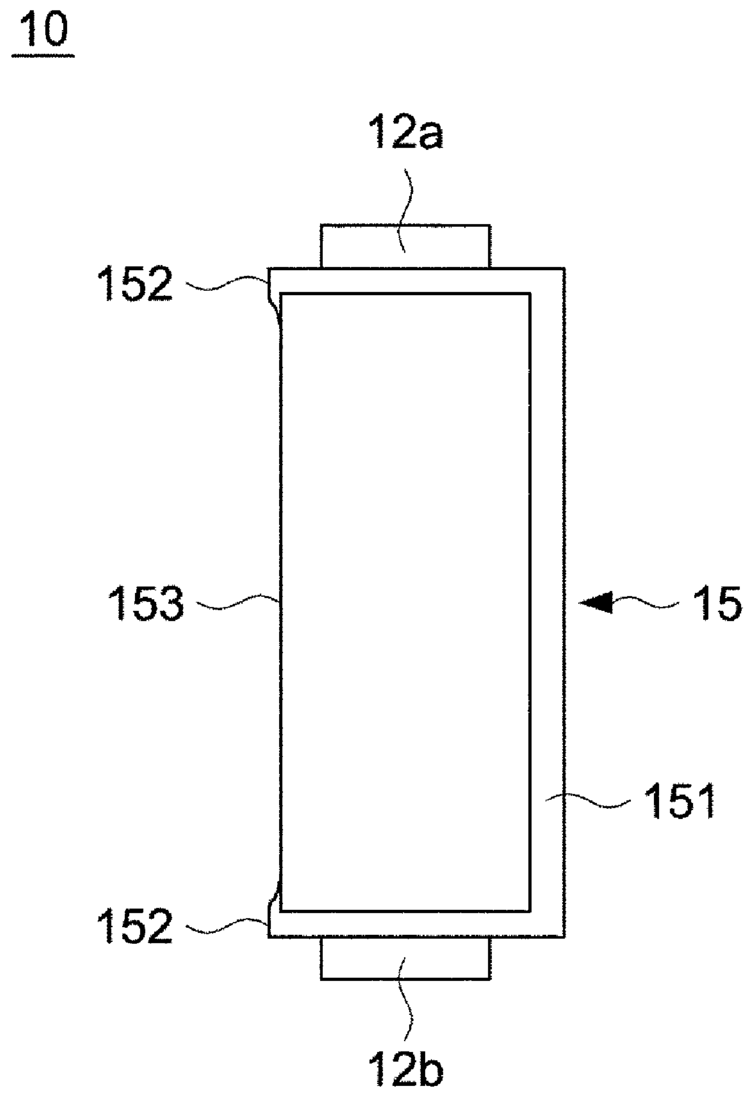
FIG. 4 is a plan view of the pouch type secondary battery according to one embodiment of the present disclosure.

FIG. 3 is a perspective view of a pouch type secondary battery 10 according to one embodiment of the present disclosure, and FIG. 4 is a plan view of the pouch type secondary battery 10 according to one embodiment of the present disclosure.

Referring to FIGS. 3 and 4, the pouch type secondary battery 10 may include an exterior material 15 which encloses an electrode assembly 11 (see FIGS. 6A and 6B) to form top and bottom surfaces and four side surfaces (also simply referred to as four sides). Electrode tabs 12*a* and 12*b* are drawn from the electrode assembly through two of the four side surfaces of the exterior material. The exterior material may include a close contact portion 153 which is formed to be in close contact with at least one side of the electrode assembly 10. The exterior material may also include a sealing portion 151 which is formed by bonding the exterior material 15 at the remaining side surfaces of the exterior material, i.e., the side surfaces other than the close contact portion 153. The sealing portion 151 may include extending portions 152 which protrude with a predetermined length L in a direction perpendicular to the close contact portion 153 at portions adjacent to the close contact portion 153. The electrode tabs 12*a* and 12*b* may be sealed between the exterior material 15 and extend through the sealing portion 151 outside of the exterior material 15.

The secondary battery 10 may include the electrode assembly 11, a positive electrode tab 12*a* and a negative electrode tab 12*b*, which protrude from the electrode assembly 11 to an outside of the exterior material 15. The electrode assembly 11 may be in the form of a jelly-roll wound in the form of a spiral by interposing a roll type separator between a positive electrode plate and a negative electrode plate, but the present disclosure is not limited thereto. For example, the electrode assembly 11 may be in a stacked form in which a positive electrode plate, a separator, and a negative electrode plate are sequentially stacked. The positive electrode tab 12*a* and the negative electrode tab 12*b* may be electrically connected to a positive electrode plate and a negative electrode plate, respectively, and may protrude from both opposite ends of the electrode assembly 11 also referred to as the small side surfaces of the electrode assembly 11. However, the present disclosure is not limited to this configuration of the electrode tabs. In another example, not shown, the positive electrode tab 12*a* and the negative electrode tab 12*b* may protrude from a single side surface of the electrode assembly 11, preferably from a single small side surface or end of the electrode assembly 11 and may be spaced apart from each other. In the illustrated embodiment of the present disclosure, a case in which the electrode tabs 12*a* and 12*b* protrude from both ends of the electrode assembly 11 will be described.

The exterior material 15 may enclose or accommodate the electrode assembly 11 from which the electrode tabs 12*a* and 12*b* are drawn. The exterior material 15 may be formed of any suitable material and may preferably formed of or include aluminum. Using aluminum for the exterior material 15 may allow to reduce the size and also lighten the pouch type secondary battery 10 and at the same time, withstand harsh thermal environments and mechanical shocks. Reducing the size may include making the pouch type secondary battery 10 thinner. A plurality of accommodation spaces 155*a* (see FIG. 6A) having a recessed shape may be formed in the exterior material 15, and the electrode assembly 11 may be arranged in the accommodation space 155*a*. After the electrode assembly 11 is arranged in the accommodation space 155*a* the exterior material 15 may be bonded along a periphery of the electrode assembly 11.

The sealing portion 151 may be formed by bonding the exterior material 15 along the periphery of the electrode assembly 11. The sealing portion 151 may be formed by bonding the exterior material 15, and may be formed preferably along the three side surfaces of a periphery of the exterior material 15. In this case, the electrode tabs 12*a* and 12*b* may be drawn through the sealing portion 151 to the outside of the sealing portion at both ends of the electrode assembly 11. For example, the electrode tabs 12*a* and 12*b* may be drawn at both ends of the electrode assembly 11 in a longitudinal direction (i.e., a vertical direction in FIG. 4) of the electrode assembly 11. However, the present disclosure is not limited thereto, and when the electrode tabs 12*a* and 12*b* protrude from one end of the electrode assembly 11 to be spaced apart from each other, the electrode tabs 12*a* and 12*b* may be drawn outside the sealing portion 151 at the one end of the electrode assembly 11.

Here, a volume of the secondary battery module may be increased by a length to which the sealing portion 151 is formed. Therefore, in the pouch type secondary battery 10 according to one embodiment of the present disclosure, the sealing portion is not formed along four side surfaces of the periphery of the electrode assembly 11, and the exterior material 15 is formed on at least one side surface thereof to be in close contact with the electrode assembly 11 so that the volume of the secondary battery module may be reduced.

The exterior material 15 may be brought into close contact with at least one of the side surfaces of the electrode assembly 11. Here, a portion of the exterior material which is brought into close contact with the electrode assembly 11 is referred to as the close contact portion 153. The close contact portion 153 may be formed to be in close contact with the electrode assembly 11.

The sealing portion 151 may include at least one extending portion 152 which protrudes to be adjacent to the electrode tabs 12*a* and 12*b*. Here, the extending portions 152 may protrude with a predetermined length L in a direction perpendicular to the close contact portion 153 at portions adjacent to the close contact portion 153. Accordingly, spaces may be formed between the extending portions 152 and the close contact portion 153 by the protruding length of the extending portion 152. Here, the length L of the extending portion 152 may be several mm. Importantly, the length of the extending portions may be controlled by design so that the extending portions may serve to secure the secondary battery 10 on a cooling plate 20 having complimentary members for receiving the extending portions 152. Two extending portions 152 may protrude in the same direction, and may be formed to protrude in a direction perpendicular to a direction in which the electrode tabs 12*a* and 12*b* protrude. The extending portions 152 may protrude from at least one of side surfaces of the electrode assembly 11 in which the electrode tabs 12*a* and 12*b* are not formed.

Furthermore, since the close contact portion 153 is formed on at least one surface of the secondary battery 10, cooling efficiency of the secondary battery 10 may be improved. The close contact portion 153 may be in contact with a cooling plate (FIG. 8) or the like for cooling the secondary battery 10. For example, a plurality of secondary batteries 10 may be stacked in parallel so that close contact portions of the plurality of secondary batteries 10 are located at lower portions thereof, and the cooling plate 20 for cooling the plurality of secondary batteries 10 may be arranged below the plurality of secondary batteries 10 to be in close contact with the close contact portions of the plurality of secondary batteries 10 (see FIG. 7).

Further, the cooling plate 20 may have a flat shape for ensuring close contact with the close contact portion 153. Since the extending portions 152 extend in the direction perpendicular to the close contact portion 153 at both ends of the close contact portion 153, the extending portions 152 may serve to maintain an arrangement of the secondary battery 10 with respect to the cooling plate 20.

Further, a method of manufacturing the pouch type secondary battery 10 according to one embodiment of the present disclosure will be described.

Figure 5:
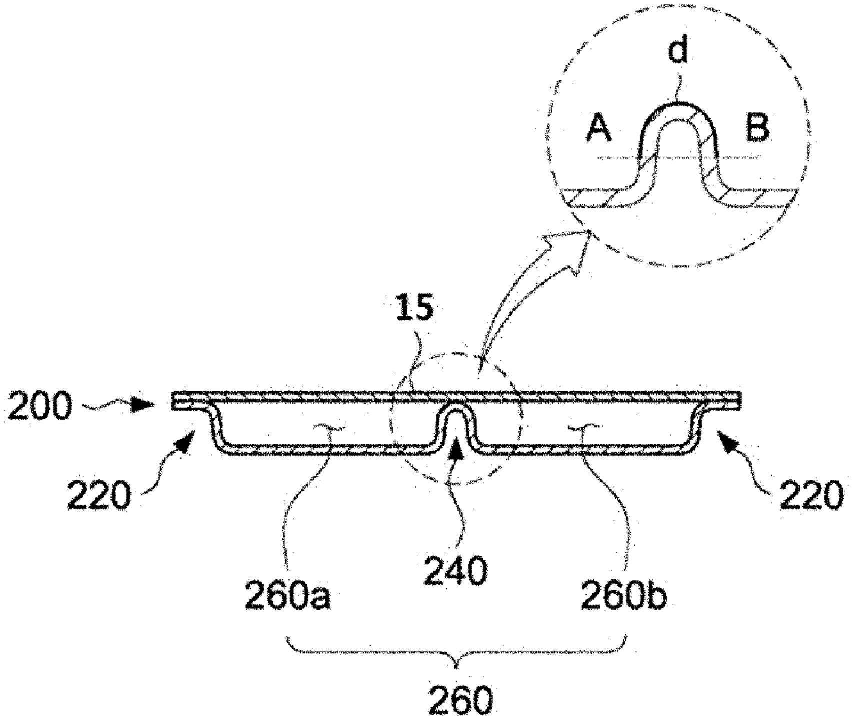
FIG. 5 is a view illustrating an exterior material and a press frame according to one embodiment of the present disclosure.

FIG. 5 is a view illustrating the exterior material 15 and a press frame 200 according to one embodiment of the present disclosure.

As illustrated in FIG. 5, the exterior material 15 may be pressed using the press frame 200 so that a shape thereof may be molded.

The press frame 200 may include a plurality of accommodation spaces 260 including a first accommodation space 260*a* and a second accommodation space 260*b* and a rounding part 240 formed in a gap between the accommodation spaces 260. The rounding part 240 is preferably rounded. Further, the press frame 200 may include sealing portions 220 to form the sealing portion 151 of the exterior material 15.

Each of the accommodation spaces 260 may be a space for accommodating the electrode assembly 11 and may have a recessed shape. In the press frame 200 according to one embodiment of the present disclosure, two accommodation spaces 260*a* and 260*b* may be formed to correspond to a shape of the exterior material 15. The press frame 200 according to one embodiment of the present disclosure illustrated in FIG. 5 may include the first accommodation space 260*a* and the second accommodation space 260*b*, but the present disclosure is not limited thereto. That is, in various embodiments of the present disclosure, the number of accommodation spaces may vary depending on the shape of the exterior material 15.

The rounding part 240 may be formed in the gap between the accommodation spaces 260. The rounding part 240 may convexly protrude in a direction opposite a recessing direction of the accommodation spaces 260. The round portion 240 may be formed to have a convex curved surface, and, for example, a cross section of the rounding part 240 may have a semicircular shape.

As described above, the shape of the rounding part 240 is not limited. However, when the cross section of the rounding part 240 has a semicircular shape, a circumference of the cross section of the rounding part 240 may be a circumference d of a semicircle from an A side to a B side illustrated in FIG. 5. Here, the A side is a side adjacent to the first accommodation space 260*a*, and the B side is a side adjacent to the second accommodation space 260*b*. An uppermost end of the rounding part 240 may be located at the same height as the sealing portion 220 or at a height close to the height.

The rounding part 240 may prevent the exterior material 15 from being broken when the exterior material 15 is pressed. This may be because of the upwardly convex shape of the rounding part 240, concentration of stress received by the exterior material 15 in the rounding part 240 may be reduced or minimized. Accordingly, breakage of the exterior material 15 may be substantially reduced or completely prevented.

The exterior material 15 may be provided in the form of a sheet preferably made of or containing aluminum or an aluminum alloy, and may be pressed toward a side at which the press frame 200 is located. Accordingly, the exterior material 15 may be pressed to have a shape of the press frame 200.

Figure 6A:
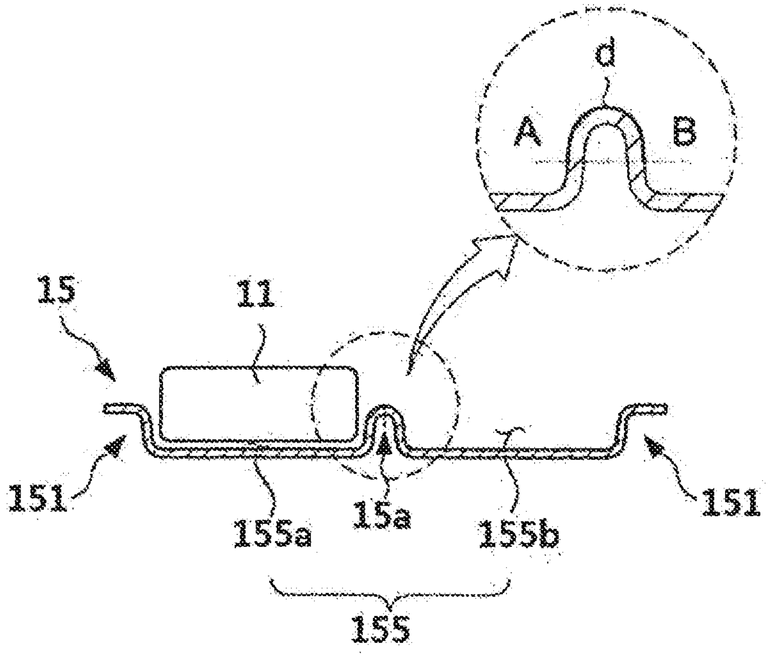
FIG. 6A is a view illustrating a state in which an electrode assembly is arranged in an accommodation space of the exterior material according to one embodiment of the present disclosure.
Figure 6B:
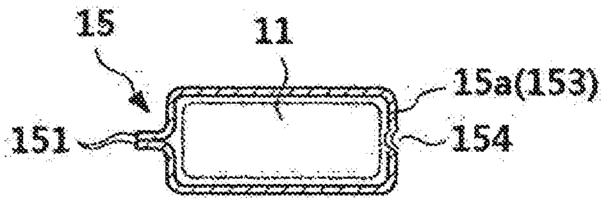
FIG. 6B is a view illustrating a state in which the exterior material according to one embodiment of the present disclosure is bonded along a periphery of the electrode assembly.

FIG. 6A is a view illustrating a state in which the electrode assembly 11 is arranged in an accommodation space 155 of the exterior material 15 according to one embodiment of the present disclosure, and FIG. 6B is a view illustrating a state in which the exterior material 15 according to one embodiment of the present disclosure is bonded along the periphery of the electrode assembly 11.

Referring to FIGS. 6A and 6B, when the exterior material 15 is pressed by the press frame 200, the electrode assembly 11 may be accommodated in the accommodation space 155 of the exterior material 15.

In the following description, a space of the accommodation space 155 of the exterior material 15 in which the electrode assembly 11 is arranged is referred to as a first accommodation space 155*a*, and a space of the accommodation space 155 of the exterior material 15 in which the electrode assembly 11 is not arranged is referred to as a second accommodation space 155*b*.

The shape of the exterior material 15 may be formed and the electrode assembly 11 may be arranged in the first accommodation space 155*a* of the exterior material 15.

When the electrode assembly 11 is arranged in the first accommodation space 155*a*, a round portion 15*a* may be unfolded along at least one of the side surfaces of the electrode assembly 11.

The round portion 15*a* may be formed to have an upwardly convex curved surface, and, for example, a cross section of the round portion 15*a* may have a semicircular shape. Accordingly, the round portion 15*a* having a convex shape may be unfolded along one side surface of the electrode assembly 11.

Here, a surface with which the round portion 15*a* is brought into close contact may be a surface on which the electrode tabs 12*a* and 12*b* are not located. That is, the round portion 15*a* may be unfolded to form the close contact portion 153 which is in close contact with the electrode assembly 11.

As described above, a concave portion 154 corresponding to a center of the round portion 15*a* may be formed in the close contact portion 153 while the round portion 15*a* having a convex shape is brought into close contact with one side surface of the electrode assembly 11. Since the electrode assembly 11 and the exterior material 15 are brought into closer contact with each other in the concave portion 154, heat may be more efficiently transmitted between the electrode assembly 11 and the exterior material 15. Therefore, the formation of the concave portion 154 may be more advantageous for cooling of the pouch type secondary battery 10.

Meanwhile, a shape of the round portion 15*a* is not limited. However, when the cross section of the round portion 15*a* has a semicircular shape, a length of a circumference of a vertical cross section of the round portion 15*a* may be a circumference d of a semicircle. That is, the circumference of the round portion 15*a* may be the circumference d of the semicircle from the A side to the B side illustrated in FIG. 6A. Here, the A side is a side adjacent to the first accommodation space 155*a*, and the B side is a side adjacent to the second accommodation space 155*b*. Therefore, the round portion 15*a* may be a portion made as a curved surface from the A side to the B side. A portion other than the portion of the round portion 15*a* of the exterior material 15 which becomes the close contact portion 153 may become a portion of the extending portion 152. Since the round portion 15*a* has a curved shape, a portion (a portion of the extending portion 152 which is adjacent to the close contact portion 153) which is not in close contact with the electrode assembly 11 may slightly protrude when the exterior material 15 is folded as illustrated in FIG. 6B.

When the round portion 15*a* is brought into close contact with the electrode assembly 11, the second accommodation space 155*b* may cover an upper side of the electrode assembly 11.

Therefore, the electrode assembly 11 may be sealed and accommodated by the exterior material 15 so that the pouch type secondary battery 10 may be formed.

Figure 7:
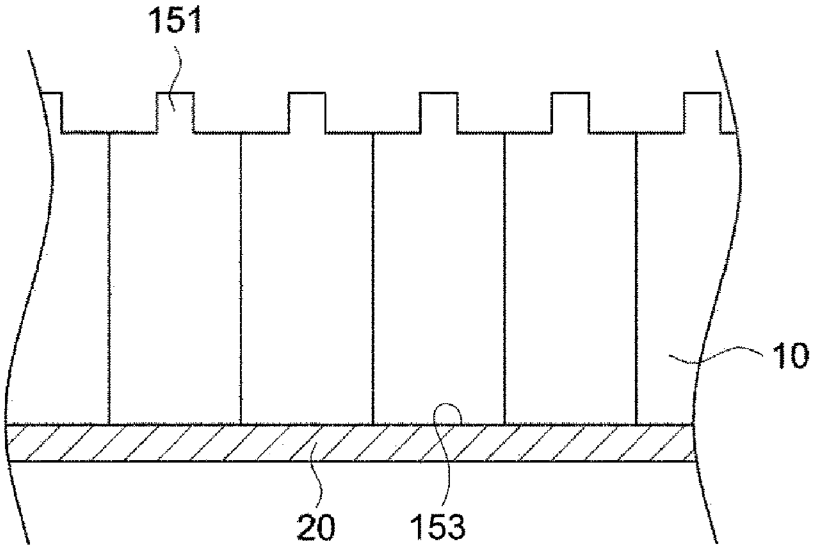
FIG. 7 is a view illustrating a state in which a cooling plate is arranged on a close contact portion of pouch type secondary batteries according to one embodiment of the present disclosure.

FIG. 7 is a view illustrating a state in which the cooling plate 20 is arranged on the close contact portions 153 of the pouch type secondary batteries 10 according to one embodiment of the present disclosure.

Referring to FIG. 7, since the electrode assembly 11 and the exterior material are in contact with each other, the close contact portion 153 in which the sealing portion 151 is not formed may provide a surface corresponding to an area of the electrode assembly 11. For example, as illustrated in FIG. 7, the close contact portion 153 in which the sealing portion 151 is not formed may provide a substantially flat surface corresponding to a substantially flat surface area of the electrode assembly 11.

The plurality of pouch type secondary batteries 10 each including the close contact portions 153 may be arranged on the cooling plate 20. Since the sealing portion 151 is not formed in the close contact portion 153, the cooling plate 20 and the close contact portion 153 may be in contact with each other. The cooling plate 20 may be brought into direct contact with the close contact portion 153 to cool the electrode assembly 11. Here, the contact between the cooling plate 20 and the close contact portion 153 may include the case in which the cooling plate 20 and the close contact portion 153 are brought into direct contact and the case in which the cooling plate 20 and the close contact portion 153 are brought into contact with each other through a gap filler, a thermally conductive adhesive, or the like interposed therebetween.

Figure 8:
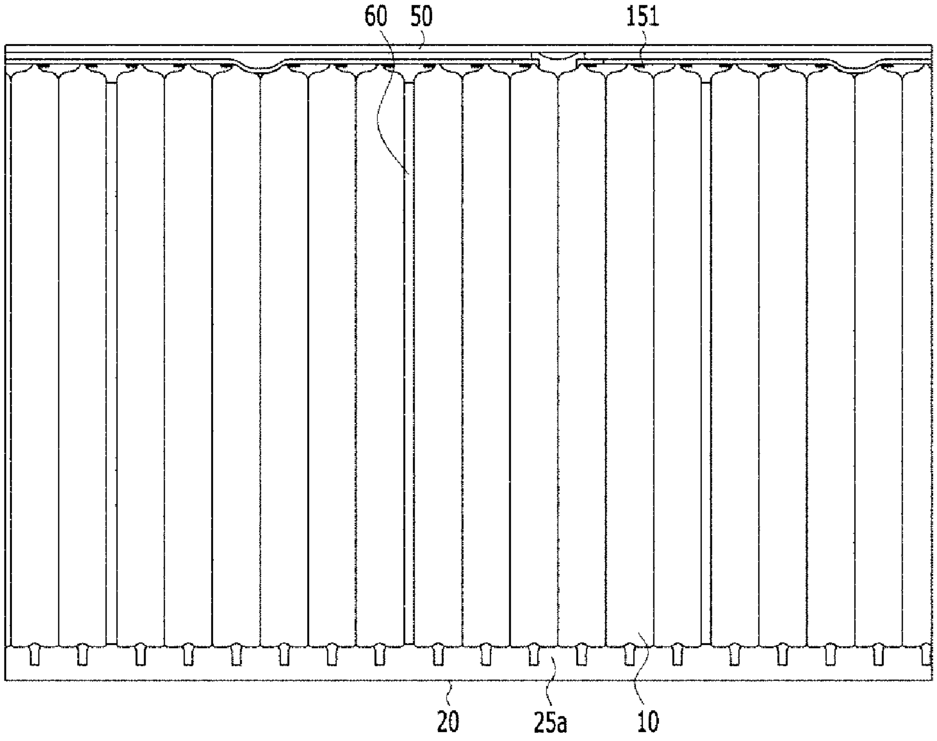
FIG. 8 is a view illustrating a secondary battery module according to one embodiment of the present disclosure.

FIG. 8 is a view illustrating a secondary battery module according to one embodiment of the present disclosure.

Referring to FIG. 8, a case 50 may be arranged on an upper side of the plurality of secondary batteries 10 which is opposite the cooling plate 20 in the secondary battery module, and the sealing portions 151 of the plurality of secondary batteries 10 may be folded so that a total volume of the secondary battery module may be reduced.

An elastic pad 60 may be arranged to be placed for every predetermined number of secondary batteries 10 of the plurality of secondary batteries 10. The elastic pad 60 may buffer inflation of the secondary batteries 10 due to swelling and prevent an external shock and vibration from being transmitted to the secondary batteries 10.

Although not illustrated, a gap filler or a thermally conductive adhesive may be used to increase a degree of contact between the plurality of secondary batteries 10 and the cooling plate 20.

Figure 9:
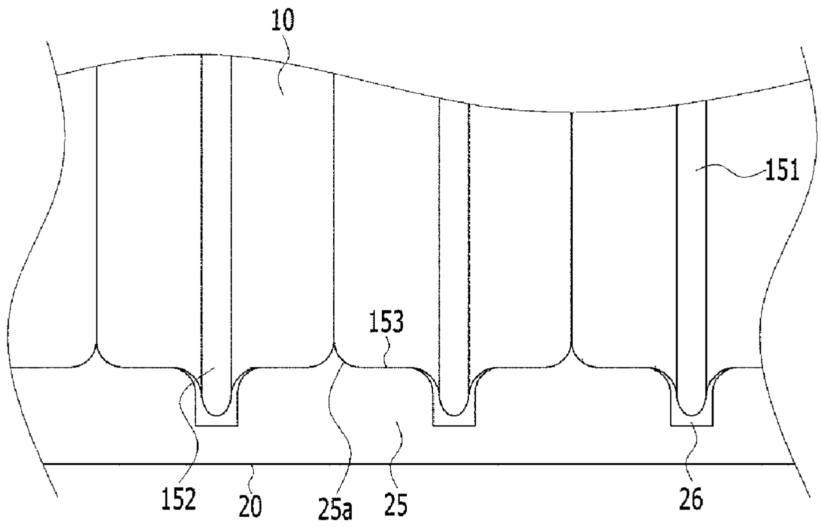
FIG. 9 is an enlarged view illustrating a state in which a plurality of secondary batteries of the secondary battery module according to one embodiment of the present disclosure are in contact with the cooling plate.

FIG. 9 is an enlarged view of a portion of FIG. 9 illustrating a state in which the plurality of secondary batteries 10 of the secondary battery module according to one embodiment of the present disclosure are in contact with the cooling plate 20.

Referring to FIG. 9, the plurality of secondary batteries 10 are stacked in parallel, and the plurality of stacked secondary batteries 10 may be arranged on the cooling plate 20 so that the plurality of secondary batteries 10 may be cooled by the cooling plate 20.

A curved surface may be formed on the cooling plate 20 along the shape of the close contact portion 153 of each of the plurality of secondary batteries 10.

Protrusions 25*a* having a curved surface corresponding to a shape of a portion of the close contact portion 153 may be formed in the cooling plate 20 to be brought into contact with the close contact portion 153 of the secondary battery 10 on the widest surface thereof. A plurality of intermediate portions 26 which may accommodate the extending portions 152 of the secondary batteries 10 may be formed on the cooling plate 20. The intermediate portions 26 may be empty spaces formed at predetermined intervals in the cooling plate 20 each shaped to receive a corresponding extending portion. The intermediate portion 26 may be formed on the cooling plate 20 in an arrangement direction of the secondary batteries 10. The extending portions 152 protruding outward from the secondary batteries 10 may be accommodated in the intermediate portions 26 so that a state in which the secondary batteries 10 are stacked in parallel may be maintained. The intermediate portion 26 as illustrated in the embodiment of FIG. 9 may have a substantially cubical shape but the invention is not limited in this way.

Table 1 below illustrates experimental results related to a temperature in the secondary battery module in the case in which the protrusions 25*a* are formed on the cooling plate 20 (left side) and in the case in which the protrusions 25*a* are not formed on the cooling plate 20 (right side).

TABLE 1

| | Cooling Plate 20 on which Protrusions 25a are formed | Cooling Plate 20 on which Protrusions 25a are not formed |
|---|---|---|
| Maximum Temperature in Secondary Battery | 35.7° C. | 38.5° C. |
| Minimum Temperature in Secondary Battery | 27.2° C. | 29.1° C. |
| Difference between Maximum Temperature and Minimum Temperature | 8.5° C. | 9.4° C. |
| Maximum Heat Resistance | 1.8 K/W | 2.2 K/W |

As described above, the cooling efficiency is substantially higher in the case of the secondary battery module having the protrusions 25*a* on the cooling plate 20 and as a result the temperature in the secondary battery module may be controlled to be lower than the temperature in the case in which no protrusions are formed on the cooling plate 20, and heat resistance thereof may be low.

Figure 10:
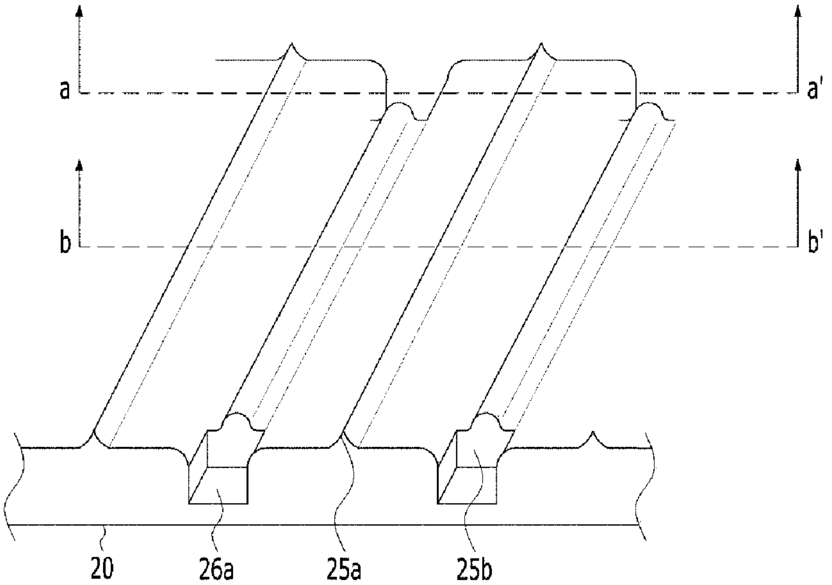
FIG. 10 is a perspective view illustrating a cooling plate according to another embodiment of the present disclosure.
Figure 11:
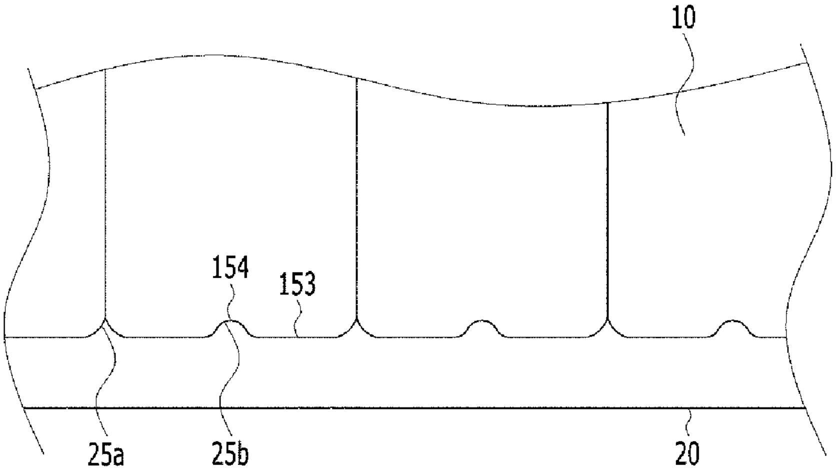
FIG. 11 is a cross-sectional view taken along line b-b' of FIG. 10.

FIG. 10 is a perspective view illustrating a cooling plate 20 according to another embodiment of the present disclosure, and FIG. 11 is a cross-sectional view taken along line b-b' in FIG. 10 and illustrates a state in which the secondary batteries are placed on the cooling plate 20.

Referring to FIG. 10, in comparison with the above embodiment, in order to increase cooling efficiency, instead of an intermediate portion being formed as an empty space formed in the cooling plate 20 to extend in parallel to an arrangement direction of the secondary batteries 10 as illustrated in FIG. 8, a portion of the intermediate portion may be formed as a concave portion support 25*b* corresponding to a shape of the concave portion 154 formed in the close contact portion 153 of the secondary battery 10. An insertion groove 26*a* which accommodates the extending portion 152 may be formed on both ends of the concave portion support 25*b*, which does not correspond to the concave portion support 25*b* in the intermediate portion. That is, in the embodiment of FIG. 9, the intermediate portion 26 formed as an empty space may be formed instead of the concave portion support 25*b*. In the embodiment of FIG. 10, the concave portion support 25*b* corresponding to the shape of the concave portion 154 of the exterior material may be located below the concave portion 154 so that the secondary battery 10 may be cooled through the concave portion 154. As described above, since the exterior material 15 is brought into closer contact with the electrode assembly 11 in the concave portion 154, cooling efficiency may be further increased as compared to the case when the concave portion support 25*b* is brought into direct contact with the concave portion 154 and cooling is performed.

When the secondary batteries 10 are placed on the cooling plate 20, a cross section taken along line a-a' of FIG. 10 may be the same as that illustrated in FIG. 8, and a cross section taken along line b-b' may be the same as that illustrated in FIG. 11. As illustrated in FIG. 11, lower sides of the plurality of secondary batteries 10 may have a structure in which the plurality of secondary batteries 10 are brought into contact with the protrusions 25*a* and the concave portion supports 25*b* to be totally cooled by the protrusions 25*a* and the concave portion supports 25*b* which are formed to correspond to the shapes thereof.

Figure 12A:
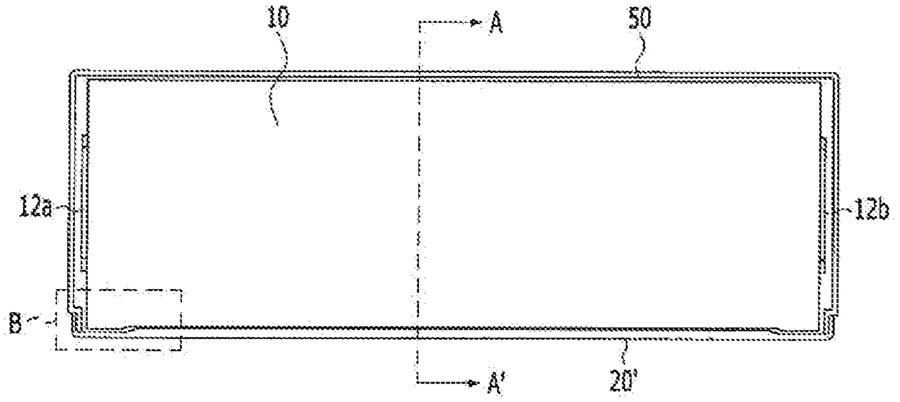
FIGS. 12A and 12B are cross-sectional views illustrating a cooling plate according to still another embodiment of the present disclosure.
Figure 12B:
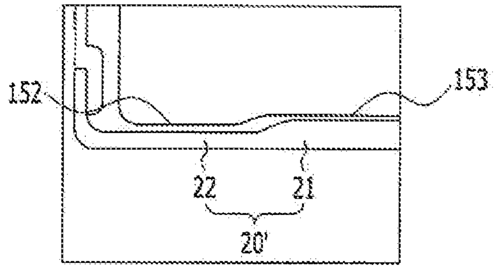
Figure 13A:
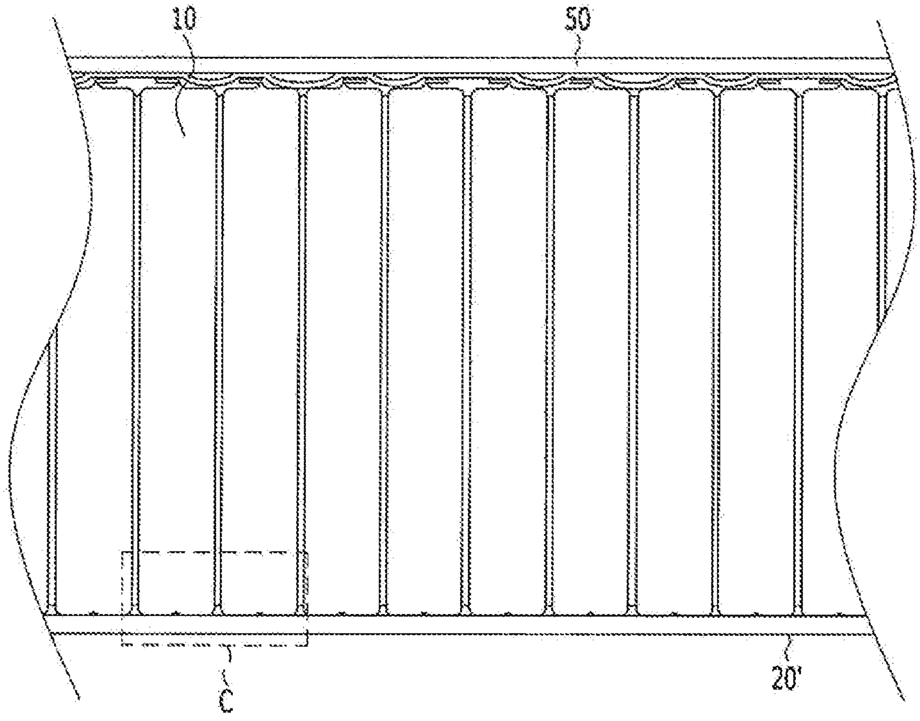
FIGS. 13A and 13B are cross-sectional views of a secondary battery module of FIGS. 12A and 12B and taken along line A-A' of FIG. 12A.
Figure 13B:
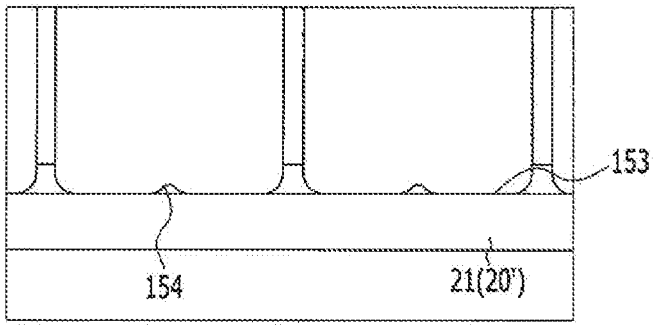

FIGS. 12A and 12B are cross-sectional views illustrating a cooling plate 20' according to still another embodiment of the present disclosure, and FIGS. 13A and 13B are cross-sectional views of a secondary battery module of FIG. 12A taken along line A-A.

Referring to FIGS. 12A, 12B, 13A and 13B, in the cooling plate 20' according to the present embodiment, step portions 22 may be formed in the cooling plate 20' in a direction (a direction perpendicular to a ground in FIGS. 12A and 12B) perpendicular to an arrangement direction (a horizontal direction in FIGS. 12A and 12B) of a plurality of secondary batteries 10 so that extending portions 152 are accommodated in a manner different from the above-described embodiments. The step portion 22 may be formed to have a space for accommodating the extending portion 152 of the secondary battery 10 by making a thickness of the step portion 22 be smaller than that of a portion 21 of the cooling plate 20' in which a step is not formed. In order to illustrate a shape of the step portion 22 in the cooling plate 20' in more detail, FIG. 12B illustrates an enlarged view of a portion B in FIG. 12A.

Unlike the above-described embodiments, in the present embodiment, the extending portions 152 may be accommodated by forming the step portions 22 in the cooling plate 20', and the cooling plate 20' may be easily manufactured in such a manner. That is, in comparison with the above-described embodiments in which grooves are formed in the cooling plate in a direction parallel to the arrangement of the secondary batteries 10, in the cooling plate 20' according to the present embodiment, since the step portions 22 are formed at both sides of the cooling plate 20', the space for accommodating the extending portion 152 may be formed only by a simple process.

FIG. 13A is a cross-sectional view of the secondary battery module of FIG. 12A taken along line A-A, and illustrates a state in which the portion 21 of the cooling plate 20' in which the step portion 22 is not formed is brought into contact with a close contact portion 153 of the secondary battery 10. FIG. 13B is an enlarged view of a portion C of FIG. 13A.

As illustrated in FIGS. 13A and 13B, in the cooling plate 20' according to the present embodiment, the portion 21 in which the step portion 22 is not formed is brought into contact with the close contact portion 153 of the secondary battery 10, and thus adhesion between the secondary battery 10 and the cooling plate 20' may be increased. Accordingly, cooling efficiency of the secondary battery 10 may be increased.

In addition, although not illustrated in FIGS. 12A, 12B, 13A and 13B, a plurality of protrusions may also be formed in the present embodiment on the cooling plate 20' in the same manner as in the above-described embodiments, so that a contact area with respect to the close contact portion 153 of the secondary battery 10 may be increased. The protrusions may have a curved surface corresponding to a shape of the close contact portion 153. Further, in the present embodiment, a concave portion support corresponding to a shape of a concave portion 154 may also be formed in the cooling plate 20' so that cooling may be performed through the concave portion 154 as well.

According to various embodiments of the present disclosure, a secondary battery module including a cooling plate capable of cooling a close contact portion of a pouch type secondary battery is provided.

Also, according to various embodiments of the present disclosure, a secondary battery module in which a sealing portion at a close contact portion of a pouch type secondary battery is not sealed and a cooling plate is brought into contact with the close contact portion is provided.

Also, according to various embodiments of the present disclosure, a secondary battery module capable of cooling a close contact portion through a cooling plate in a pouch type secondary battery in which a sealing portion is not formed in the close contact portion is provided.

While embodiments of the preset disclosure have been described above in detail, those skilled in the art should understand that the embodiments may be variously modified without departing from the scope of the present disclosure. Therefore, the scope of the present disclosure is defined not by the described embodiment but by the appended claims, and encompasses equivalents that fall within the scope of the appended claims.

What is claimed is:

1. A secondary battery module comprising:

a plurality of stacked pouch type secondary batteries; and a cooling plate configured to cool the plurality of stacked pouch type secondary batteries, wherein each of the pouch type secondary batteries includes:

an electrode assembly connected to electrode tabs;

an exterior material including first and second accommodation spaces formed to be spaced apart from each other, and accommodating the electrode assembly in the first and second accommodation spaces; and a sealing portion and a close contact portion formed by the exterior material in an outer periphery of the first and second accommodation spaces, wherein the sealing portion is formed at three sides of four sides of the pouch type secondary battery by bonding of the exterior material, the three sides including a first side, a second side, and a third side, the first side and the second side extending in a first direction and the third side extending a second direction approximately perpendicular to the first direction, wherein the close contact portion is formed at a fourth side of the four sides of the pouch type secondary battery, the fourth side extend in the second direction, wherein an inner surface of the close contact portion is in contact with the electrode assembly, wherein an outer surface of the close contact portion faces an outside in the first direction, and wherein the sealing portion includes:

a first extending portion connected to a first end of the close contact portion and protruding outwardly in the first direction with respect to the outer surface of the close contact portion, a second extending portion connected to a second end of the close contact portion and protruding outwardly in the first direction with respect to the outer surface of the close contact portion, and wherein the first extending portion and the second extending portion are respectively disposed at opposite ends of the close contact portion so as to be spaced apart from each other, wherein the sealing portion at the third side is disposed at an opposite end portion to the close contact portion in the first direction, wherein the first and second extending portions protrude in a direction perpendicular to a direction in which the electrode tabs protrude externally.

2. The secondary battery module of claim 1, wherein the close contact portion includes a concave portion formed into a surface of the close contact portion and extending along a length of the close contact portion.

3. The secondary battery module of claim 2, wherein the concave portion is configured to be in close contact with the electrode assembly.

4. The secondary battery module of claim 1, wherein the cooling plate has a plurality of protrusions formed thereon; and wherein each of the protrusions is positioned between the close contact portions of adjacent pouch type secondary batteries.

5. The secondary battery module of claim 4, wherein each of the protrusions has a curved surface corresponding to a shape of a portion of the close contact portion.

6. The secondary battery module of claim 4, wherein the plurality of protrusions are arranged in the same direction as a stacking direction of the plurality of pouch type secondary batteries.

7. The secondary battery module of claim 2, wherein the cooling plate includes a concave portion support protruding toward the close contact portion so as to correspond to the concave portion.

8. The secondary battery module of claim 1, wherein the secondary battery module further includes a gap filler or a thermally conductive adhesive disposed between the close contact portion of the plurality of pouch type secondary batteries and the cooling plate.

9. The secondary battery module of claim 1, wherein the secondary battery module further includes an elastic pad disposed between some of the plurality of pouch type secondary batteries.

10. The secondary battery module of claim 1, wherein the cooling plate includes:

a first insertion groove accommodating the first extending portion; and a second insertion groove accommodating the second extending portion.

11. The secondary battery module of claim 10, wherein the close contact portion includes a concave portion being concave toward the electrode assembly, wherein the concave portion extends along a length of the close contact portion, wherein the cooling plate includes a concave portion support protruding toward the close contact portion so as to correspond to the concave portion.

12. The secondary battery module of claim 11, wherein the concave portion support is positioned between the first insertion groove and the second insertion groove.

13. A method for manufacturing a secondary battery module comprising:

adding a thermally conductive adhesive on a cooling plate;

arranging a plurality of pouch type secondary batteries on the cooling plate, wherein each of the plurality of pouch type secondary batteries includes:

an electrode assembly connected to electrode tabs;

an exterior material including first and second accommodation spaces formed to be spaced apart from each other, and the exterior material accommodating the electrode assembly in the first and second accommodation spaces; and a sealing portion and a close contact portion formed by the exterior material in an outer periphery of the first and second accommodation spaces, wherein the sealing portion is formed at three sides of four sides of the pouch type secondary battery by bonding of the exterior material, the three sides including a first side, a second side, and a third side, the first side and the second side extending in a first direction and the third side extending a second direction approximately perpendicular to the first direction, wherein the close contact portion is formed at a fourth side of the four sides of the pouch type secondary battery, the fourth side extend in the second direction, wherein an inner surface of the close contact portion is in contact with the electrode assembly, wherein an outer surface of the close contact portion faces an outside in the first direction, and wherein the sealing portion includes:

a first extending portion connected to a first end of the close contact portion and protruding outwardly in the first direction with respect to the outer surface of the close contact portion, a second extending portion connected to a second end of the close contact portion and protruding outwardly in the first direction with respect to the outer surface of the close contact portion, and wherein the first extending portion and the second extending portion are respectively disposed at opposite ends of the close contact portion so as to be spaced apart from each other, wherein the sealing portion at the third side is disposed at an opposite end portion to the close contact portion in the first direction, wherein the first and second extending portions protrude in a direction perpendicular to a direction in which the electrode tabs protrude externally, and wherein the cooling plate is in contact with the close contact portions of the plurality of pouch type secondary batteries.

14. The method according to claim 13, further comprising:

placing an elastic pad between adjacent two pouch type secondary batteries of the plurality of pouch type secondary batteries.

15. The method according to claim 13, further comprising:

arranging a case on an upper side of the plurality of pouch type secondary batteries.

16. The method according to claim 13, wherein arranging the plurality of pouch type secondary batteries on the cooling plate includes stacking the plurality of pouch type secondary batteries.

* * * * *